United States Patent

Smith et al.

[11] 3,843,237
[45] Oct. 22, 1974

[54] PRISMATIC REAR VIEWING SYSTEM FOR MOTOR VEHICLES

[75] Inventors: Stanley E. Smith, Dayton; James R. Steck, Brookville, both of Ohio

[73] Assignee: General Motors Corporation, Detroit, Mich.

[22] Filed: Sept. 27, 1972

[21] Appl. No.: 292,527

[52] U.S. Cl............... 350/302, 350/286, 350/287, 350/299, 350/307
[51] Int. Cl. ............................................. G02b 5/08
[58] Field of Search .......... 350/302, 286, 287, 179, 350/307, 48, 49, 301, 299

[56] References Cited
UNITED STATES PATENTS

| | | | |
|---|---|---|---|
| 851,154 | 4/1907 | Blair | 350/302 X |
| 2,130,006 | 9/1938 | Gundlach | 350/287 X |
| 2,297,240 | 9/1942 | Neumann | 350/179 |
| 3,224,330 | 12/1965 | Kompfner | 350/301 X |
| 3,489,486 | 1/1970 | Clerva | 350/287 |
| 3,498,697 | 3/1970 | Matteo | 350/302 |
| 3,659,927 | 5/1972 | Moultrie | 350/307 |

FOREIGN PATENTS OR APPLICATIONS

| | | | |
|---|---|---|---|
| 884,162 | 12/1961 | Great Britain | 350/301 |
| 1,810,588 | 10/1970 | Germany | 350/302 |
| 439,158 | 8/1949 | Canada | 350/287 |

*Primary Examiner*—Ronald L. Wibert
*Assistant Examiner*—Michael J. Tokar
*Attorney, Agent, or Firm*—Peter D. Sachtjen

[57] ABSTRACT

A triangular prism extends through a roof opening in a motor vehicle for providing the driver with a rearward field of view over the roof. The prism includes a front transparent base face facing the driver and rearwardly converging upper and lower rear reflectorized leg faces. The rearward image is refracted at the upper front face to the upper leg face and reflected therefrom incident to the middle portion of the front face at greater than the critical angle. The image is then totally internally reflected to the lower leg face for reflection therefrom to the lower front face and refraction to the driver. The prism is formed in a three-plate shell which is filled with a refractorally compatible liquid. An expansion bellows compensates for differential volumetric expansion between the fluid and the shell.

4 Claims, 7 Drawing Figures

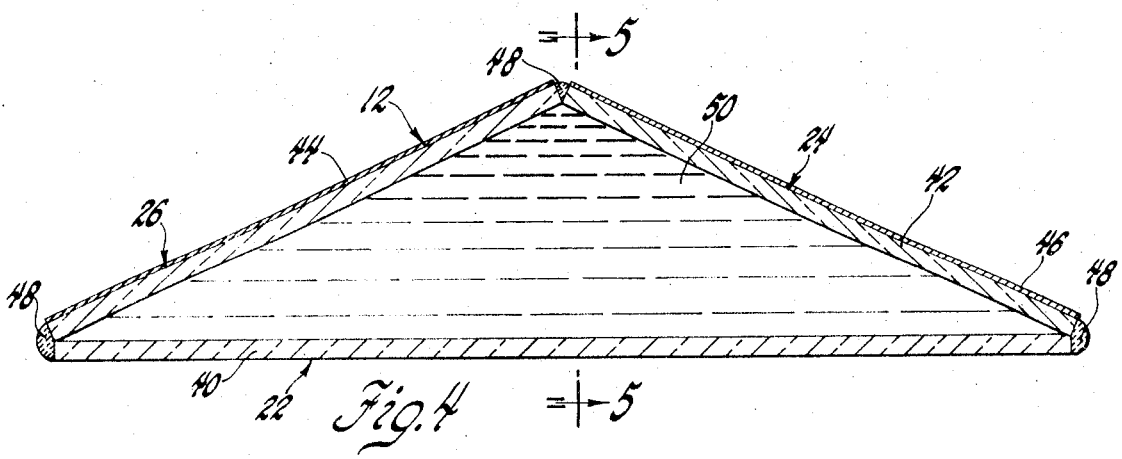
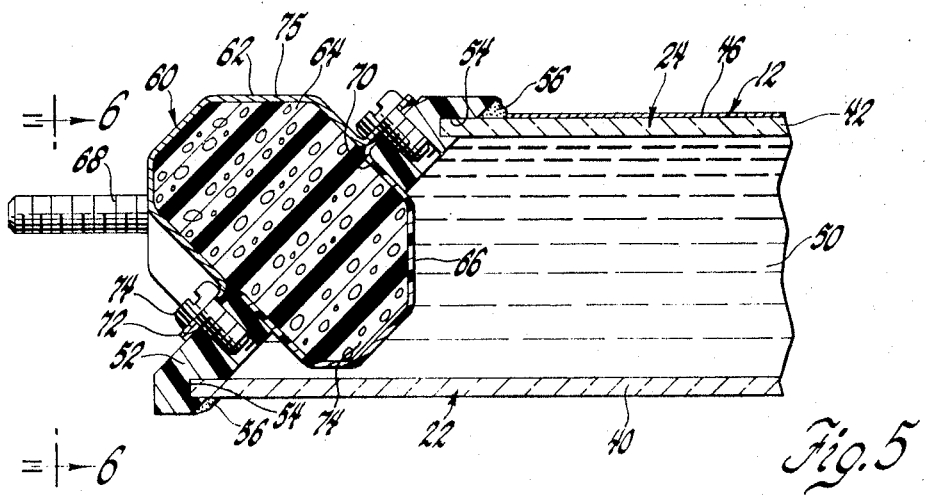
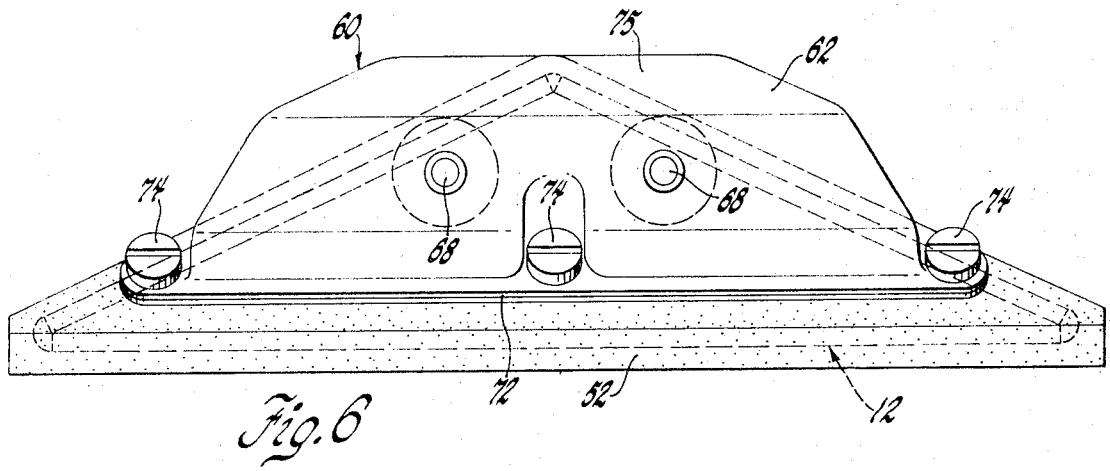

PRISMATIC REAR VIEWING SYSTEM FOR MOTOR VEHICLES

The present invention relates to rear viewing systems and, in particular, to a motor vehicle periscopic rear viewing system using a prism for providing the driver with a rearward view over the vehicle roof.

A recently proposed regulation sets forth requirements for greatly expanded fields or rear vision in motor vehicles. A periscopic viewing system is one way which has been proposed to meet these requirements. Such a system uses multiple planar mirrors for viewing over the vehicle roof from an interior location. Generally one mirror is located for establishing a rearward sight path over the vehicle roof and at least two additional mirrors redirect the images to a convenient viewing location in the passenger compartment. However, in systems of this type the mirrors must be positioned so as to avoid optical interference with one another. This interference is usually remedied by decreasing the size of the mirrors or increasing the spacing therebetween and thus the optical length of the system. The effect of either solution is to reduce the observable rearward field of view.

Increasing the sizes of the mirrors as an alternative only increases the aforementioned problem of optical interference. This causes the viewing system to become unbearably large and lengthy thereby reducing its suitability for use in motor vehicles. The need to balance the mirror size and the mirror spacing thus limits the flexibility and effectiveness of conventional periscope systems.

To reduce the optical length of the system, it has been proposed to use a one-way mirror in the periscopic arrangement. The line of sight is through the one-way mirror element onto a second element and then back to the one-way mirror for reflection to a terminal mirror. This routing reduces the optical length and consequently the size of the intermediate and terminal mirrors to give a compact viewing arrangement having a reasonably sized terminal mirror. However, it sacrifices optical efficiency for compactness. The optical efficiency is at a maximum for a one-way having a 50 percent reflectivity. This means that the overall optical efficiency of the system is below 25 percent. Under present guidelines, such performance would not be acceptable.

A rear viewing system made in accordance with the present invention features optical compactness and efficiency not provided in the above systems. The system uses a single optical element, a fluid filled triangular prism, to route images from the rear over the roof to the driver. The prism has a transparent base face disposed partially above the roof of the vehicle. The prism includes two rear reflectorized leg faces. The three prism faces are laterally sealed at their edges and at the ends to provide a thin wall triangular shell. This shell is filled with a liquid having a refractive index which is similar to the same as the material of the faces. This provides a prism having an adequate refractive index to obtain total internal reflection from the front face. The liquid construction reduces a system weight by approximately 50 percent in comparison with a solid prism. Expansion bellows on the ends of the prism expand and contract in the fluid cavity to compensate for differential expansion between the fluid and the shell.

The prism is located within an opening in the vehicle roof adjacent to be windshield. Rearward images are incident on the upper portion of the front face and are refracted thereat through the medium onto the upper reflectorized leg face. The image is then conventionally reflected toward the middle portion of the front face. The incident angle is greater than the critical angle for the prism media such that the image is totally internally reflected onto the lower reflectorized leg face where the image is conventionally reflected to the lower portion of the front face and refracted thereat to the driver. This system then provides three reflections which result in an erect mirror image. By using the prism with multiple internal reflections, any optical interference is eliminated which permits optimum compactness of the reflecting faces. By using total internal reflection instead of a one-way mirror, the system obtains a high degree of optical efficiency. Whereas one-way mirror periscopic systems have been found to provide efficiencies of around twenty percent, the present prismatic viewing system will provides an optical efficiency in excess of 50 percent.

dr The above and other features of the present invention will be apparent to one skilled in the art upon reading the following detailed description, reference being made to the accompanying drawings illustrating a preferred embodiment of the present invention in Which:

FIG. 4 is an enlarged cross sectional view of the prism;

FIG. 5 is a view taken along line 5—5 of FIG. 4 showing the fluid filled prism construction and the expansion bellows;

FIG. 6 is a view taken along line 6—6 of FIG. 5 showing the orientation of the end plates and the expansion bellows with respect to the prism shell and, FIG. 7 is a schematic view showing the image ray trace through the prism.

Figure 1:
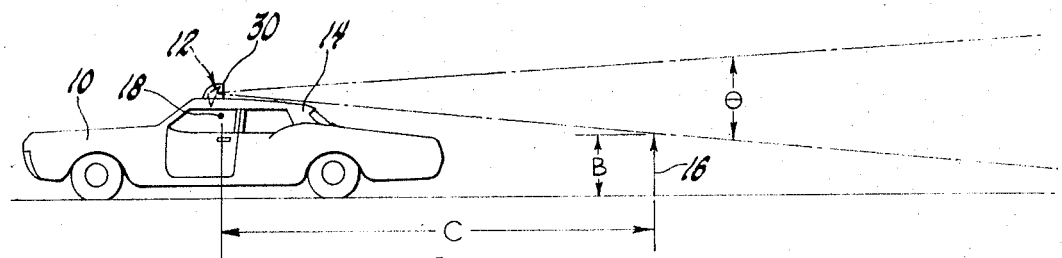
FIG. 1 is a schematic side elevational view of a motor vehicle incorporating a prismatic rear viewing system made in accordance to the present invention illustrating the vertical field of view.
Figure 2:
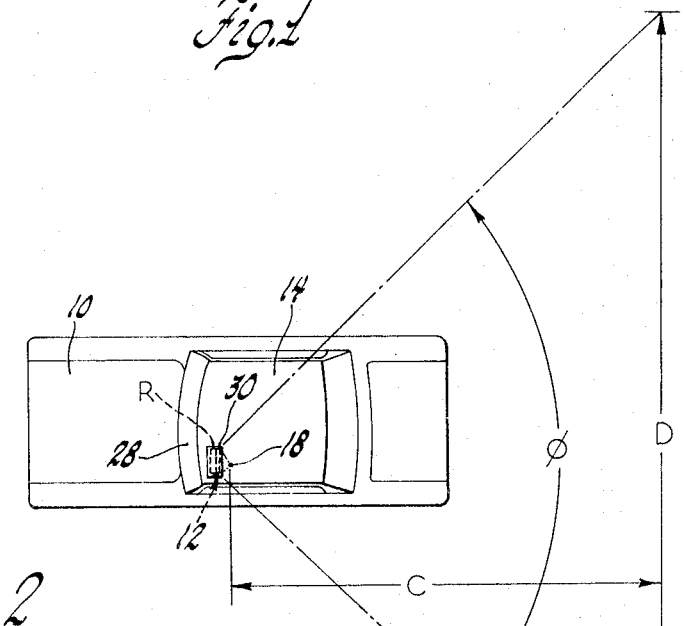
FIG. 2 is a schematic top view of the motor vehicle illustrating the horizontal field of view.

Referring to FIGS. 1 and 2, there is shown a motor vehicle 10 having a periscopic rear viewing system including a prism 12 which, as hereinafter described, provides a rearward field of view over the vehicle roof 14. As shown in FIG. 1, the periscopic rear viewing system provides a vertical field of view $\theta$ that intercepts an article 16 having a height B at a distance C rearwardly of the driver or viewing point 18. As shown in FIG. 2, the system provides a horizontal field of view $\phi$ that intercepts a width D at the aformentioned distance C.

A typical standard would provide that a two foot article 16 be observable at a 30 foot distance C from the viewing point 18. The standard would also provide that at the distance C, a 50 foot width D would be observable by the system.

Figure 3:
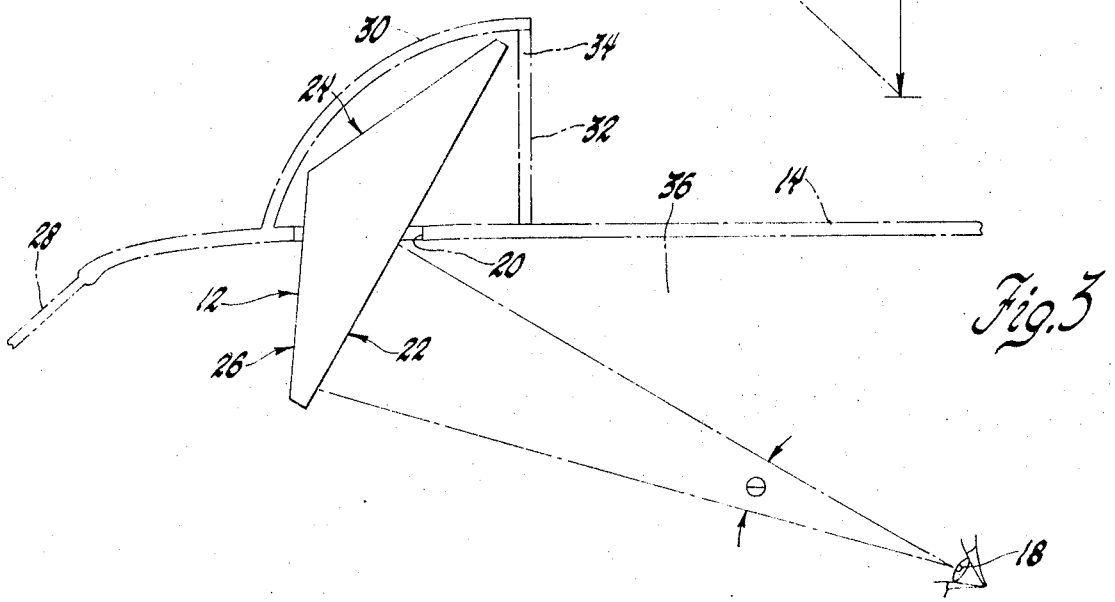
FIG. 3 is an enlarged schematic view illustrating the disposition of the prism with respect to the vehicle roof.

The subject prismatic rear vision system provides this requisite field of view. As shown in FIG. 3, the prism 12 is generally vertically disposed at a slight upward and rearward inclination within a rectangular opening 20 in the roof 14. The prism 12 has a generally trinagular cross section. As referenced to the driver or viewing point 18, the prism 12 has a transparent or clear base face 22 and rearwardly corresponding reflectorized leg faces 24, 26. The opening 20 is generally rectangular and is located adjacent the vehicle windshield 28. A shield 30 covers the upper portion of the prism 12. The shield 30 defines a rearward opening 32 sealed by a cover glass 34. The lower portion of the prism 12 is located below the roof 14 interior of the passenger compartment 36. The front face 22 is substantially equally disposed above and below the roof 14. The actual displacement of course will be dependent on other considerations such as the desired vertical field of view $\theta$ and the roof line of the vehicle. The driver 18 views the lower portion of the prism 12 with the horizontal viewing angle $\phi$ and thervertical viewing angle $\theta$.

Referring to FIGS. 4 through 6, the prism 12 comprises a liquid filled shell which is mounted laterally within the aforementioned opening 20. In particular, the prism 12 in cross section forms an isosceles triangle. The prism 12 includes a transparent or clear front base face 22 defined by a glass plate 40 and the converging upper and lower leg faces 24 and 26 defined by glass plates 42 and 44 respectively. The plate 42, 44 have reflective coatings 44, 46. The plates 40, 42, 44 converge at lateral edges and are sealed and joined at seams 48 of a suitable plastic material. An alternate construction uses an enclosure which covers the rear faces and is sealed at the edges of the front plate 40. The interior surfaces of the three plates 40, 42, and 44 form a triangular interior cavity 50. The cavity 50 is filled with a liquid having a refractive index substantially the same as the plate material. For glass plates having a refractive index of 1.50, a suitable liquid would be equal parts of ethylene gylcol and water having a refractive index of 1.38 or dop-di octyl phalate having a refractive index 1.48. While it is preferable to match the refractive index of the shell, any liquid can be used which will provide for the total internal reflection at the front face 22.

The use of the fluid fill reduces the weight of the prism by approximately 50 percent when compared to a solid glass structure. At the same time, optically accurate surfaces are easily obtained by the use of glass plates.

As shown in FIGS. 5 and 6, the ends of the cavity are sealed by end plates 52 having mating grooves 54 for receiving the ends of the glass plates 40, 42 and 44. A plastic peripheral bead 56 seals the end plates 52 to the glass plates. The end plates 52 converge rearwardly at approximately a 45° angle with respect to the top edge of the front plate 40.

A mounting and expansion bellows assembly 60 is mounted on each end plate 52. The assembly 60 comprises a cover plate 62, a foam spring 64 and a diaphragm 66, and mounting studs 68. A generally triangular opening 70 is formed in the end plates 52 for receiving the foam spring 64 and the diaphragm 66. The diaphragm 66 has a triangular free form and is peripherally clamped by screws 74 between the rim 72 of the cover plate 62 and the outer surface of the end plate 52. The foam spring 64 is received in a center dome section 75 of the cover plate 62. The foam spring 64 comprises a low density urethane foam. The spring 64 has sufficient volume to cause the diaphragm 66 to fluctuate in response to lateral shifting of the liquid mass during vehicle movement and thereby prevent fluid separation.

The expansion bellows assembly 60 will provide an adjusting mechanism to compensate for the volumetric expansion differentials between the glass and the fluid. As the temperature rises, the liquid will expand at a greater rate of the glass. This will compress the foam spring 64 so as to maintain a constant fluid pressure. As the temperature decreases, the liquid will contract at a greater rate in the glass shell and the foam spring 64 will stretch the diaphragm 64 to maintain a constant fluid pressure.

The mounting studs 68 are adapted to be secured to suitable support structure for permitting rotation of the prism 12 about a horizontally disposed axis so as to vary the vertical field of view.

Figure 7:
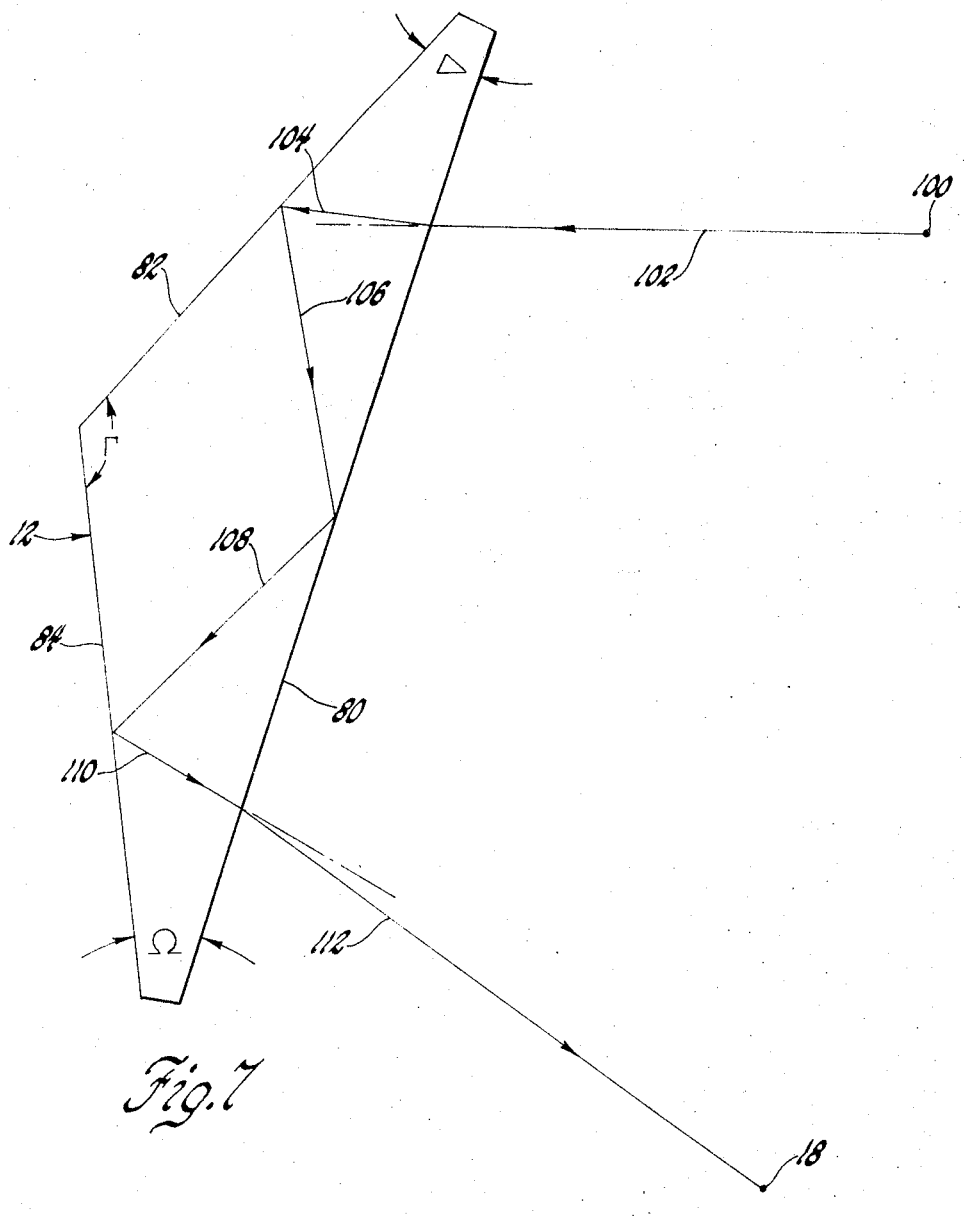

Referring to FIG. 7, the prism 12 is shown schematically and includes a front hypoteneus face 80 facing the driver or viewing point 18 and rearwardly converging upper and lower reflectorized leg faces 82 and 84. The upper leg face 82 is disposed at an angle $\Delta$ to the front face 80. The lower leg face 84 is disposed at an angle $\Omega$ with respect to the front face 80. The leg faces 82, 84 converge at an angle $\Gamma$. The prism is preferably isosceles triangle to minimize chromatic dispersion. However, unequal legs and angles can be used to the extent the desired image routing can be obtained and chromatic dispersion tolerated.

An image point 100 is routed through the liquid filled prism 12 by three internal reflections in the following manner. A ray 102 from point 100 incidents the upper portion or the front face 80 at a first surface. The ray is then conventional refracted at the interface along ray 104 to the upper leg face 82 at a second surface. The ray 104 is reflected from the upper leg face 82 along ray 106 to the middle portion of the hypoteneus face 80 at a third surface. The sector intercepted by the image will be partially coextensive with the entering and exiting image sectors. The ray 106 is incident to the third surface or front face 80 at an angle greater than the critical angle which for glass having a refractive index of 1.50 is 41.9°. Accordingly, the ray is totally internally reflected along ray 108 onto the lower leg surface 84 at a fourth surface. The ray is then reflected along ray 110 to the lower portion of the front face 80 at a fifth or exit surface. The ray 110 is refracted at the exit surface outwardly along ray 112 to the viewer 18.

The above ray trace schematic assumes a substantially constant refractive index for the prism. In the event the liquid has a different refractive index than the glass plates, a second refraction will take place at the interface with the fluid. For less refractive fluid, the incident angle at the rear surfaces will become shallower and accordingly the reflected angle toward the middle of the front face will become steeper. It will, of course, be necessary to maintain the refractive index within a range that will cause the indident angle at the third face to be greater than the critical angle.

Thus, it will be seen that three internal refractions take place within the prism. Two reflections are at reflectorized surfaces while one reflection takes place at the transparent hypoteneus face. With this reflection arrangement, it is thus possible with the use of a single element to route images from the rear to the driver. Inasmuch as optical interference is eliminated in the prism an extremely compact triangular prismatic envelope is provided which serves to reduce the weight and accordingly the cost of the prism structure.

The system above described is designed to provide a compact periscope viewings device for a given motor vehicle with a given roof line. It has an inherent advantage due to its shape for maintaining a clear front surface through which the image passes. However, modifications to the basic shape could be made and yet maintain the same image displacement method. For instance, the apex at the rear leg faces could be truncated to give a trapezoidal shape. This would be advantageous if the periscope had to displace the image a large vertical distance thereby eliminating a portion of the fluid. The front (clear) face of the prism could also be formed as two or more surfaces depending on the desired image routing.

A prismatic rear viewing system fulfilling the above objectives has been provided on a 1972 Chevrolet Body style B-69 with the construction data below:

| | |
|---|---|
| Angle Δ | 25 degrees |
| Angle Ω | 25 degrees |
| Angle Γ | 130 degrees |
| Front Face 80 | 7 × 24 inches |
| Upper Face 82 | 4 × 24 inches |
| Lower Face 84 | 4 × 24 inches |
| Distance 80 to 18 | 14 inches |
| Height above Roof 14 | 3.8 inches |
| Angle θ | 35 |
| Angle φ | 90 degrees |

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A prismatic rear viewing system for a motor vehicle having an opening in the roof thereof, comprising: a generally triangular prism adapted to be laterally positioned in said opening above and below said roof, said prism including first, second and third angularly related transparent plates having interior surfaces defining an elongated cavity, said first plate facing the driver of the vehicle, said second and third plates being disposed at equal acute angles with respect to said first plate and converging at an obtuse angle rearwardly of said first plate, reflective surfaces on the exterior surfaces of said second and third plates, means at the ends of said plates closing said cavity, a transparent fluid filling said cavity, said fluid having a refractive index which with the refractive index of said plates and the angles therebetween will cause an image incident on said first plate to be refracted to one of said reflective surfaces for refraction and reflection back toward the exterior surface of said first plate at an angle greater than the critical angle for the plates whereby the image will be totally internally reflected therefrom to the other reflective surface for reflection therefrom to said first plate and transmission to said driver.

2. In a motor vehicle having an opening in the roof thereof adjacent a windshield, a prismatic rear viewing system for providing the driver with a viewing field over the roof, comprising: a triangular prism posiitoned laterally within the opening and extending above and below said roof, said prism having three angularly related glass plates with interior surfaces defining a triangular cavity, end means closing the ends of said cavity, a liquid filling said cavity, one of said plates facing the driver of the vehicle and extending generally vertically through the opening above and below said roof, said one of said plates having an exterior surface defining a common entrance and exit face, the other two plates being equally angularly disposed with respect to said one of said plates and converging at an obtuse angle of around 120° rearwardly of said one of said plates, a reflective surface on the exterior of said other two plates, the fluid in said cavity having a suitable refractive index which with the refractive index of said plates and the angles between the plates will cause images incident on said entrance face to be transmitted from the reflective surfaces at greater than the critical angle for glass whereby the images will be totally interiorally reflected therefrom for transmission to the other reflective surface for reflection and refraction to the driver, expansion means fluidly communicating with said cavity, said expansion means maintaining a substantially constant pressure on the liquid to prevent fluid separation during vehicle movement and compensate for differential volumetric expansion between the liquid and the glass plates.

3. In a motor vehicle having an opening in the roof thereof adjacent a windshield, a prismatic rear viewing system for providing the driver with a viewing field over the roof, comprising: a shield carried on the roof and surrounding the opening, said shield having a rearward viewing opening therein, a triangular prism positioned laterally within the roof opening, said prism having an upper portion located above the roof within said shield and a lower portion located within the vehicle, said prism having first, second and third angularly related glass plates extending laterally with respect to the roof opening, said plates having surfaces defining a triangular cavity, end plates closing the ends of said cavity, a liquid filling said cavity having a refractive index substantially the same as glass, said first glass plate being completely transparent and extending generally vertically through the roof opening above and below said roof, said first glass plate facing the driver and having an exterior surface defining an image entrance face aligned with said viewing opening in the shield and an image exit face facing the driver, said second plate located above said roof and angularly disposed at an acute angle of around 30° with respect to said first glass plate, the third glass plate located below said roof and angularly disposed at an acute angle of around 30° with respect to said first glass plate and converging with said second glass plate at an obtuse angle of around 120° rearwardly of said first glass plate, a first reflective surface on the exterior surface of said second glass plate, a second reflective surface on the exterior of said third glass plate, the overall refractive index of the glass plates and the liquid, and the angles between the plates causing images incident on said entrance face to be reflected to the first reflective surface and reflected therefrom at greater than the critical angle for glass with respect to said first glass plate whereby the images will be totally internally reflected therefrom to the second reflective surface for reflection to the exit face and refraction therefrom to the driver, an expansion bellows including a flexible diaphragm carried by one of said end plates, said diaphragm fluidly communicating with said cavity, a compressed spring member acting on said diaphragm and effective to maintain a substantially constant pressure on the liquid to prevent fluid separation during vehicle movement and to compensate for differential volumetric expansion between the liquid and the glass plates.

4. A periscopic viewing system for viewing rearwardly over the roof of a motor vehicle by a viewer located interior of the vehicle, the roof having a laterally extending opening therein, said system comprising: a prism formed of a transparent media positioned laterally of the vehicle and extending through the opening in the roof; a planar transparent first surface on the front of an upper portion of the prism, said first surface facing the viewer and receiving images from the rear of the vehicle and refracting the images thereat; a planar reflective second surface on the rear of said upper portion of the prism, said second surface being angularly disposed with respect to said first surface to receive the images refracted at said first surface and to reflect said images therefrom; a planar transparent third surface on the front of a middle portion of said prism, said third surfaces being angularly disposed with respect to the images reflected from said second surface at greater than the critical angle of the prism media so as to totally internally reflect said images therefrom; a planar reflective fourth surface at the rear of said prism, said fourth surface being angularly disposed with respect to said third surface to receive the totally internally reflected images and reflect said images therefrom; a planar transparent fifth surface on the front of the lower portion of the prism for receiving the reflected images from said fourth surface, said fifth surface being angularly disposed with respect to the fourth surface so as to refract said images thereat for transmission to the viewer.

* * * * *